United States Patent [19]

Chou

[11] Patent Number: 5,058,787
[45] Date of Patent: Oct. 22, 1991

[54] CANNED BEVERAGE FIXTURE ATTACHED IN AN AUTOMOBILE

[76] Inventor: Ching Y. Chou, No. 7, Alley 11, Lane 382, Sec.3, Ho Ping W. Rd., Taipei, Taiwan

[21] Appl. No.: 604,079

[22] Filed: Oct. 25, 1990

[51] Int. Cl.$^5$ ............................................. B60R 7/00
[52] U.S. Cl. ......................... 224/42.46 R; 248/312.1; 248/318
[58] Field of Search ............... 224/42.45 R, 42.46 R, 224/148, 30 A; 248/311.2, 312.1, 314, 315, 318, 214, 215, 221.4, 224.4; 211/71, 74

[56] References Cited

U.S. PATENT DOCUMENTS 3,480,244  11/1969  Iversen ................................ 248/315
4,071,218   1/1978  Pecka et al. ...................... 248/312.1
4,154,383   5/1979  Honatzis ...................... 224/42.45 R

FOREIGN PATENT DOCUMENTS 1115669  1/1982  Canada ............................. 224/42.42
3327238  2/1985  Fed. Rep. of Germany ... 248/311.2

Primary Examiner—Linda J. Sholl
Attorney, Agent, or Firm—Esso International Patent and Trademark Office

[57] ABSTRACT

A canned beverage fixture attachable to the interior of an automobile; a handle portion of the fixture can be inserted in the gap between car window glass and the window frame, or it may be looped around the locking pin of the car door. The fixture comprises a fixing ring connected with a handle portion by means of a hanging belt. The lower edge of the fixing ring is formed into a barbed ring portion that facilitates insertional movement of the fixing ring around the top edge (rim) of the canned beverage.

1 Claim, 3 Drawing Sheets

CANNED BEVERAGE FIXTURE ATTACHED IN AN AUTOMOBILE

This application is a substitute of S.N. 228,325 filed Aug. 4, 1988 now abandoned.

BACKGROUND OF THE INVENTION

At the present time, the automobile is considered a convenient means of transportation, and it has the advantages of comfort and quickness; therefore, the automobile has been an indispensable item in our daily life. However, the inner space of an automobile is limited. During long distance travel in an automobile, the driver or rider will experience some inconvenience. Particularly, beverages in a car are difficult to handle because the person has no proper place to hold them. In case of the beverage being turned over while the car is running, it is susceptible to affecting the concentration of the driver; therefore an accident might be caused. Moreover, most beverages are sweetened fluids; whenever that fluid is poured inside the car rug or on a rider's clothes, it will cause the user some inconvenience and a cleaning problem.

SUMMARY OF THE INVENTION

In view of the aforesaid problems, the inventor has, through repeated studies and tests, developed a canned beverage fixture, which is to be attached in an automobile.

The prime object of the present invention is to provide a canned beverage fixture that can be easily attached in an automobile; the fixture may integrally be made of plastic material at a low cost; the fixture may be thrown away after use. When a canned beverage fixture embodying the present invention is used in a car, the driver will not worry about the possibility of turning over a canned beverage to distract the concentration of the driver.

Another object of the present invention is to provide a canned beverage fixture in which the fixture ring has a special barbed ring portion for securely and simply holding a canned beverage. Since the size and shape of the aluminum canned beverage are a world-wide standard, the fixture according to the present invention can be used widely for a wide variety of canned beverages.

DETAILED DESCRIPTION

Figure 1:
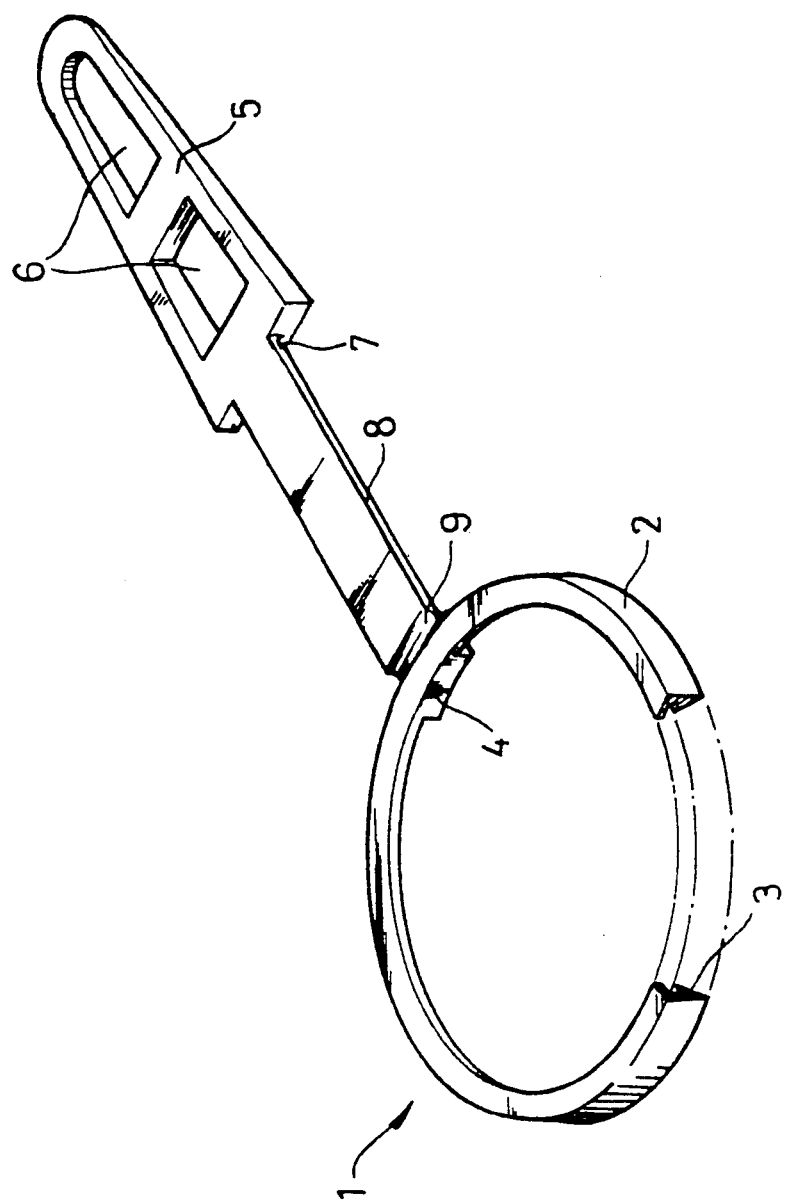
FIG. 1 is a perspective view of an embodiment according to the present invention.
Figure 2:
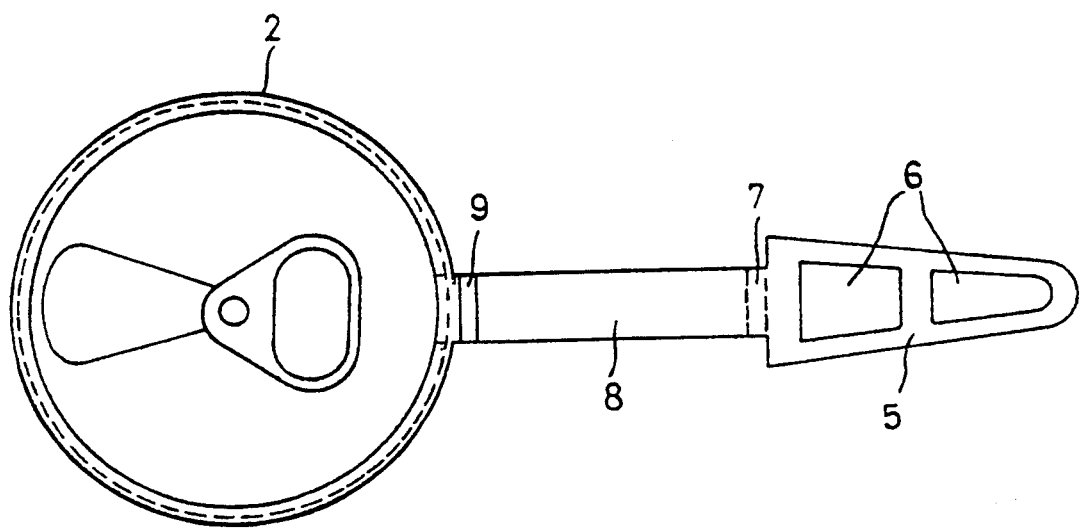
FIG. 2 is a top view of the present invention.
Figure 3:
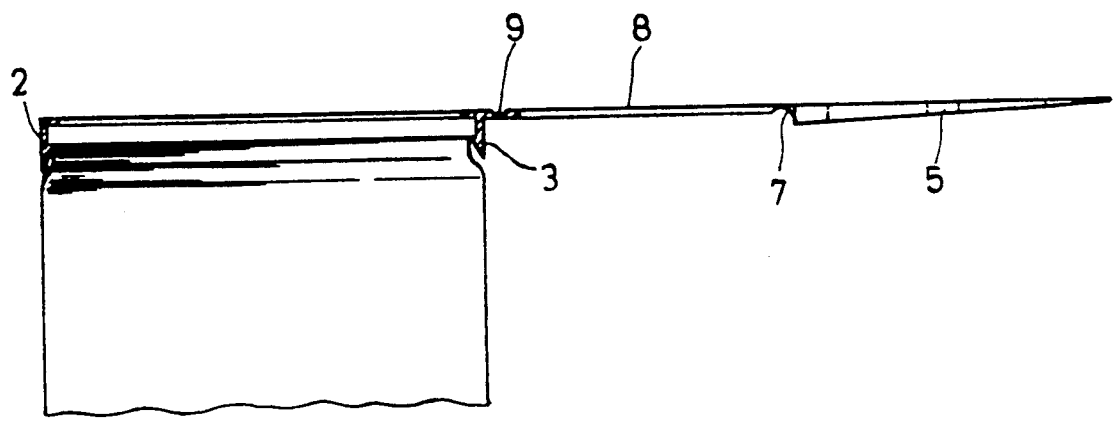
FIG. 3 is a side and sectional view of the present invention.

Referring to FIGS. 1, 2 and 3, there is shown a canned beverage fixture 1 comprising a fixing ring 2 with a barbed ring 3, which is used to grip the rim portion of a canned beverage. A connecting piece 4 is provided between the fixing ring 2 and a hanging belt 8 to prevent the canned beverage from being dropped. The rear end of the hanging belt 8 has a groove 9 facing upwards. When the fixing ring bears the weight of the canned beverage, the opening portion of the groove 9 will become smaller. Another groove 7 is also furnished between the handle portion 5 and the hanging belt 8, but the opening portion of that groove 7 is facing downwards. When the hanging belt bears the weight of a canned beverage, the opening portion of the groove 7 will become smaller. The thickness of the rear end of the handle portion 5 is reduced gradually (as seen in FIG. 3) so as to facilitate insertion of the handle portion into the gap between the window glass and the window frame (as depicted in FIG. 40); the handle portion may also be mounted on the locking pin on the car door by means of the hanging hole 6 on the handle portion.

FIG. 3 illustrates that a canned beverage can easily be mounted in the fixture 1 by putting the fixing ring 2 over the top in portion of the canned beverage and pressing it downwards slightly. Since the lower edge of the fixing ring 2 has a barbed ring portion 3, the canned beverage can be held in place without being dropped. The barbed cross section of ring 3 (as seen in FIG. 3) enables the ring portion 3 to have a cam action on the rim of the can; thereby facilitating insertion of the fixture on the can.

Figure 4:
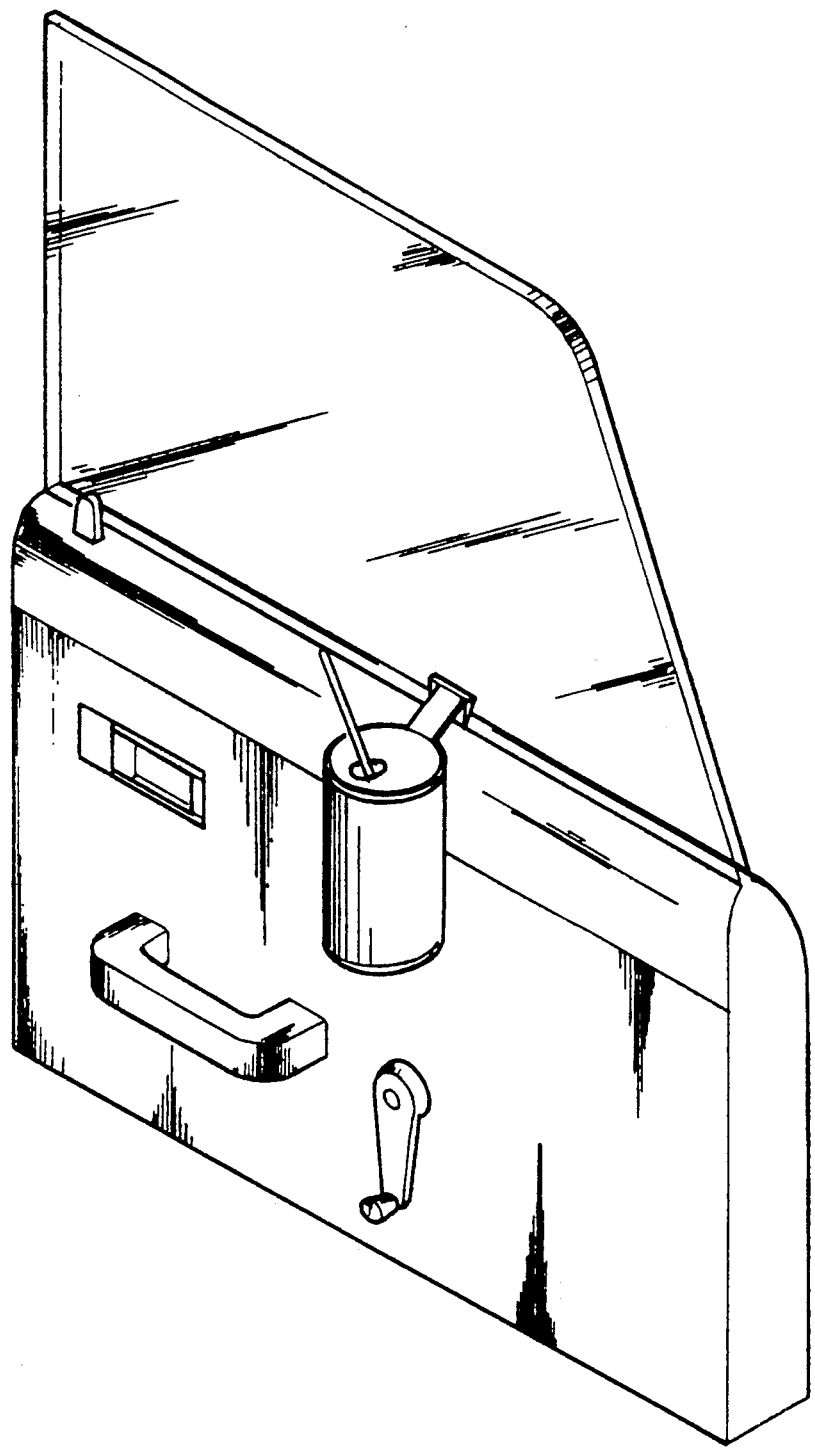
FIG. 4 is a perspective view (1) showing the present invention being attached inside a car.

FIGS. 4 and 5 illustrate two methods for mounting the fixture 1 on the car door or on the locking pin 10 of the car window so as to make the beverage can available to any person in the car.

The fixture shown in the attached drawings is somewhat similar to a litter bag unit shown in U.S. Pat. No. 4,154,383 issued to R. Honatzis. However the structure disclosed in the Honatzes patent does not include grooves similar to the upwardly-facing groove 9 and the downwardly facing groove 7 of my proposed fixture. With the device shown in the attached drawings the can-suspension ring 2 can extend horizontally outwardly from a generally vertically extending strip portion 8 while handle portion 5 extends generally downwardly (vertically) from strip portion 8 into the clearance space between a car window and window frame.

As seen in FIG. 3 of the attached drawings, each groove 7 or 9 has a width dimension that is appreciably greater than its depth dimension, such that the plastic sections can readily undergo hinge motions of ninety degrees or more in opposite directions. The fixture can thus accommodate itself to a wide range of automobile surface curvatures while still having the suspension ring 2 extend horizontally straight out from the attached strip 8. The illustrated structure has the advantages of multi-direction flexibility (due to the orientation and configuration of grooves 7 and 9), and proper suspension of the beverage can. The beverage container can be used for drinking purposes without disconnecting fixture 1 from the container. When it is desired to return the container to a suspended position the hinged handle portion 5 can be easily manipulated to the condition of FIG. 4 or FIG. 5.

What is claimed is:

1. A fixture engageable with the upper edge lip portion of a beverage can to suspend the can within an automobile, comprising:

a circular ring (2) extending in a plane normal to the ring axis; said ring having a channel cross-section that includes a web wall extending normal to the ring plane, an upper flange extending radially inwardly from said web wall parallel to the ring plane, and a lower flange extending radially inwardly from said web wall below the upper flange; said lower flange having a lower face that is inclined upwardly and radially inward to form a cam surface that can slide over the upper edge of a beverage can when said ring is pressed downwardly onto and around the can whereby a lip portion of the can is positioned between the upper and lower flanges of the ring;

said fixture further comprising a flat plastic strip (8) formed integrally with said circular ring; said plastic strip extending radially outwardly from said circular ring as a planar continuation of the ring upper flange; said flat strip having a generally flat upper face and a flat lower face; said flat upper face having an upwardly-facing transverse groove (9) at the connection point between the strip and the ring; said upwardly-facing groove having a width dimension that is appreciably greater than its depth dimension whereby said flat strip can undergo a hinge motion to a position extending substantially directly upward from the ring plane when the ring is oriented in a horizontal plane;

said fixture further comprising an elongated plastic handle portion (5) formed integrally with said plastic strip; said plastic handle portion having a flat upper face formed as a planar continuation of the strip upper face, said handle portion having a wedge-shaped cross section wherein the lower face of the handle portion converges at a slight angle to the upper handle portion upper face when measure in a direction going away from said plastic strip (8);

the lower face of said plastic strip (8) having a downwardly-facing transverse groove (7) at the connection point between the strip and the handle portion; said downwardly-facing groove having a width dimension that is appreciably greater than its depth dimension, whereby said handle portion can undergo a hinge motion to a position extending substantially directly downward from the plane of said strip (8) when said strip is oriented in a horizontal plane; said handle portion being adapted for insertion downwardly into a vertical gap between a window glass and a window frame of an automobile, with the associated strip (8) lying against an exposed interior surface of the automobile and the circular ring (2) extending in a horizontal plane at a substantial angel to said strip (8).

* * * * *